US009711926B2

(12) United States Patent
Belanger, Jr.

(10) Patent No.: US 9,711,926 B2
(45) Date of Patent: Jul. 18, 2017

(54) METHOD OF FORMING AN INTERFACE FOR AN ELECTRICAL TERMINAL

(71) Applicant: Lear Corporation, Southfield, MI (US)

(72) Inventor: Thomas D. Belanger, Jr., New Hudson, MI (US)

(73) Assignee: Lear Corporation, Southfield, MI (US)

( * ) Notice: Subject to any disclaimer, the term of this patent is extended or adjusted under 35 U.S.C. 154(b) by 258 days.

(21) Appl. No.: 14/527,331

(22) Filed: Oct. 29, 2014

(65) Prior Publication Data

US 2015/0135530 A1    May 21, 2015

Related U.S. Application Data

(60) Provisional application No. 61/906,247, filed on Nov. 19, 2013.

(51) Int. Cl.
*H01R 43/16* (2006.01)
*B33Y 80/00* (2015.01)
*H01R 13/03* (2006.01)

(52) U.S. Cl.
CPC .............. *H01R 43/16* (2013.01); *B33Y 80/00* (2014.12); *H01R 13/03* (2013.01); *Y10T 29/4921* (2015.01)

(58) Field of Classification Search
CPC ........ B33Y 80/00; H01R 13/03; H01R 43/16; Y10T 29/4921
See application file for complete search history.

(56) References Cited

U.S. PATENT DOCUMENTS

| 1,132,094 | A | | 3/1915 | Hosford |
| 2,774,951 | A | * | 12/1956 | Hammell ............... H01R 11/22 |
| | | | | 439/849 |
| 2,921,287 | A | | 1/1960 | Matthysse et al. |
| 3,550,069 | A | | 12/1970 | Teagno |
| 3,633,153 | A | | 1/1972 | Ahmed et al. |
| 3,914,009 | A | | 10/1975 | Chia et al. |
| 4,040,713 | A | | 8/1977 | Könnemann |
| 4,351,583 | A | | 9/1982 | Belttary |
| 4,540,235 | A | | 9/1985 | Lolic |

(Continued)

FOREIGN PATENT DOCUMENTS

| CN | 102034656 A | 4/2011 |
| CN | 104009312 A | 8/2014 |

(Continued)

OTHER PUBLICATIONS

Chinese 1st Office Action, Application No. 201010203667.3 dated Nov. 27, 2013.

(Continued)

*Primary Examiner* — Minh Trinh
(74) *Attorney, Agent, or Firm* — MacMillan, Sobanski & Todd, LLC (57) ABSTRACT

A method of forming an electrical terminal includes the steps of: transferring a portion of electrically conductive material to a selected location on a surface of electrically conductive material stock; bonding the portion of electrically conductive material to the surface of the electrically conductive material stock; forming the portion of electrically conductive material to the surface of the electrically conductive material stock to define a conductive interface; and forming the electrical terminal from the electrically conductive material stock.

10 Claims, 9 Drawing Sheets

(56) References Cited

U.S. PATENT DOCUMENTS

| | | |
|---|---|---|
| 4,553,799 A | 11/1985 | Deters |
| 4,553,808 A | 11/1985 | Weidler et al. |
| 4,570,147 A | 2/1986 | Ebi |
| 4,583,812 A | 4/1986 | Gross, Jr. et al. |
| 4,646,052 A | 2/1987 | Matsunaga et al. |
| 4,672,352 A | 6/1987 | Takano |
| 4,751,490 A | 6/1988 | Hatagishi |
| 4,842,534 A * | 6/1989 | Mobley ............. H01H 85/2035 337/191 |
| 4,869,686 A | 9/1989 | Michaels et al. |
| 4,869,972 A | 9/1989 | Hatagishi |
| 4,871,990 A | 10/1989 | Ikeda et al. |
| 4,932,877 A | 6/1990 | Zinn |
| 4,941,851 A | 7/1990 | Hsueh |
| 4,958,426 A * | 9/1990 | Endo ................... H01H 85/0417 219/121.12 |
| 5,007,865 A | 4/1991 | Jakobeit |
| 5,035,661 A | 7/1991 | Steinhardt et al. |
| 5,088,940 A | 2/1992 | Saito |
| 5,094,636 A | 3/1992 | Zinn et al. |
| 5,147,230 A | 9/1992 | Plyler et al. |
| 5,226,842 A | 7/1993 | Endo et al. |
| 5,246,390 A | 9/1993 | Egenolf |
| 5,288,252 A | 2/1994 | Steinhardt et al. |
| 5,350,321 A | 9/1994 | Takenouchi |
| 5,386,903 A | 2/1995 | Rothschild et al. |
| 5,416,461 A | 5/1995 | Totsuka et al. |
| 5,427,552 A | 6/1995 | Zielinski et al. |
| 5,437,566 A | 8/1995 | Zinn et al. |
| 5,474,475 A | 12/1995 | Yamaguchi |
| 5,488,346 A * | 1/1996 | Kondo ................. H01H 85/044 29/623 |
| 5,573,434 A | 11/1996 | Ittah et al. |
| 5,581,225 A | 12/1996 | Oh et al. |
| 5,591,051 A | 1/1997 | Ittah |
| 5,647,772 A | 7/1997 | Martucci et al. |
| 5,658,174 A | 8/1997 | Benes et al. |
| 5,662,487 A | 9/1997 | Okamura et al. |
| 5,679,034 A | 10/1997 | Hanazaki et al. |
| 5,716,245 A | 2/1998 | Kameyama et al. |
| 5,739,741 A | 4/1998 | Hanazaki et al. |
| 5,745,024 A * | 4/1998 | Ohta ....................... H01H 85/08 337/166 |
| 5,795,193 A | 8/1998 | Yang |
| 5,868,590 A | 2/1999 | Dobbelaere |
| 5,886,611 A | 3/1999 | Schaller et al. |
| 6,036,529 A | 3/2000 | Brown et al. |
| 6,092,280 A | 7/2000 | Wojnarowski |
| 6,126,495 A | 10/2000 | Lolic et al. |
| 6,178,106 B1 | 1/2001 | Umemoto et al. |
| 6,404,322 B1 * | 6/2002 | Ruegsegger .......... F16B 31/007 337/159 |
| 6,431,880 B1 | 8/2002 | Davis et al. |
| 6,454,601 B1 | 9/2002 | Vaitkus et al. |
| 6,506,060 B2 | 1/2003 | Sumida et al. |
| 6,558,198 B2 | 5/2003 | Kobayashi et al. |
| 6,648,674 B1 | 11/2003 | Dobler |
| 6,722,926 B2 | 4/2004 | Chevassus-More |
| 6,759,938 B2 | 7/2004 | Matsumura et al. |
| 6,824,430 B2 | 11/2004 | Matsumura et al. |
| 6,872,103 B1 | 3/2005 | Flieger et al. |
| 7,071,808 B2 | 7/2006 | Nakamura |
| 7,592,892 B2 | 9/2009 | Ito et al. |
| 7,595,715 B2 | 9/2009 | Pavlovic et al. |
| 7,612,647 B2 | 11/2009 | Onoda et al. |
| 7,766,706 B2 | 8/2010 | Kawamura et al. |
| 7,892,050 B2 * | 2/2011 | Pavlovic ................ H01R 9/245 439/250 |
| 8,182,299 B2 | 5/2012 | Schrader |
| 2003/0037959 A1 * | 2/2003 | Master ................... H01L 23/145 174/256 |
| 2004/0124963 A1 | 7/2004 | Nakamura |
| 2006/0205267 A1 | 9/2006 | Darr et al. |
| 2006/0223385 A1 | 10/2006 | Pavlovic et al. |
| 2008/0224814 A1 | 9/2008 | Pavlovic et al. |
| 2009/0085712 A1 | 4/2009 | Pavlovic et al. |
| 2010/0323563 A1 | 12/2010 | Pavlovic et al. |
| 2011/0076901 A1 | 3/2011 | Glick et al. |
| 2012/0285720 A1 | 11/2012 | Chou |
| 2014/0227913 A1 | 8/2014 | Natter |
| 2014/0227915 A1 | 8/2014 | Glick et al. |
| 2014/0273659 A1 | 9/2014 | Glick et al. |
| 2015/0135530 A1 * | 5/2015 | Belanger, Jr. .......... B33Y 80/00 29/877 |

FOREIGN PATENT DOCUMENTS

| | | |
|---|---|---|
| CN | 104051884 A | 9/2014 |
| JP | 09147731 | 6/1997 |
| JP | 2000133114 A | 12/2000 |
| WO | 2012/069499 A1 | 5/2012 |

OTHER PUBLICATIONS

Chinese 2nd Office Action, Application No. 201010203667.3 dated Jul. 17, 2014.

* cited by examiner

METHOD OF FORMING AN INTERFACE FOR AN ELECTRICAL TERMINAL

CROSS REFERENCE TO RELATED APPLICATIONS

This application claims the benefit of U.S. Provisional Application No. 61/906,247 filed Nov. 19, 2013, the disclosure of which is incorporated herein by reference.

BACKGROUND

This invention relates in general to the manufacture of electrical terminals such as those found in electrical connectors. In particular, this invention relates to an improved method of forming an electrical terminal for an electrical connector that reduces manufacturing costs.

Electrical connectors often include a male terminal which is inserted into a separate female terminal. The male and female terminals are each connected to a desired electrical component or power source to complete an electrical circuit when the male and female terminals are in contact with one another. Contact surfaces on the male and female terminals include electrically conductive material, such as copper, silver, and precious metals, that provides an electrical path between the male and female terminals.

The cost of desirable electrically conductive metals, especially copper and precious metals, is high relative to the overall cost of the electrical connector in which such metals are used. Attempts have been made to reduce the cost of manufacturing electrical terminals by various methods. For example, it is known to add a clad interface layer to an electrical terminal base by welding or soldering, or to weld an electrical wire to an electrical terminal base. Welding, however, may negatively alter the mechanical properties of the welded material, may cause oxidation, and may result in undesirable micro-voids at the interface of the base material and the electrically conductive material.

It is also known to electro-plate precious metal, i.e., expensive electrically conductive metal, to only selected portions of an electrical terminal base. This process however, results in increased costs associated with additional process steps, may require customized material inventory management systems, and the wet chemical process associated with electro-plating requires additional, and often cumbersome, hazardous waste management processes. It is further known to use copper clad aluminum as the base material, but the increased cost of copper negates any potential savings from process efficiencies. Additionally, it is known to form the electrical terminal base from aluminum rather than copper, and then add a clad interface layer by welding or soldering. This method of forming an electrical terminal requires bonding a transition layer of material between the electrical terminal base and the precious metal to be clad to allow soldering, and may require a burnishing or cleaning process to remove surface oxides from the electrical terminal base. It would therefore be desirable to provide an improved method of forming an electrical terminal for an electrical connector that reduces the amount of precious metal used, and therefore reduces manufacturing costs.

SUMMARY

This invention relates to an improved method of forming an electrical terminal for an electrical connector that reduces manufacturing costs. The method of forming an electrical terminal includes the steps of: transferring a portion of electrically conductive material to a selected location on a surface of electrically conductive material stock; bonding the portion of electrically conductive material to the surface of the electrically conductive material stock; forming the portion of electrically conductive material to the surface of the electrically conductive material stock to define a conductive interface; and forming the electrical terminal from the electrically conductive material stock.

Various advantages of this invention will become apparent to those skilled in the art from the following detailed description, when read in view of the accompanying drawings.

DETAILED DESCRIPTION

Referring now to the drawings, there is illustrated in FIGS. 1 through 4 an electrical terminal 10 that, to the extent shown, is representative of both a conventional structure for an electrical terminal and an improved structure for an electrical terminal for use in an electrical connector in accordance with this invention. The illustrated electrical terminal 10 includes a terminal body 12 having a first end 12a and a second end 12b. The illustrated terminal body 12 has a substantially hollow rectangular shape having first and second side walls, 12c and 12d, respectively, connected by third and fourth side walls, 12e and 12f, respectively. Although illustrated as having a hollow rectangular shape, the terminal body 12 may have other suitable shapes, such as a hollow square shape or a cylindrical tube.

Figure 1:
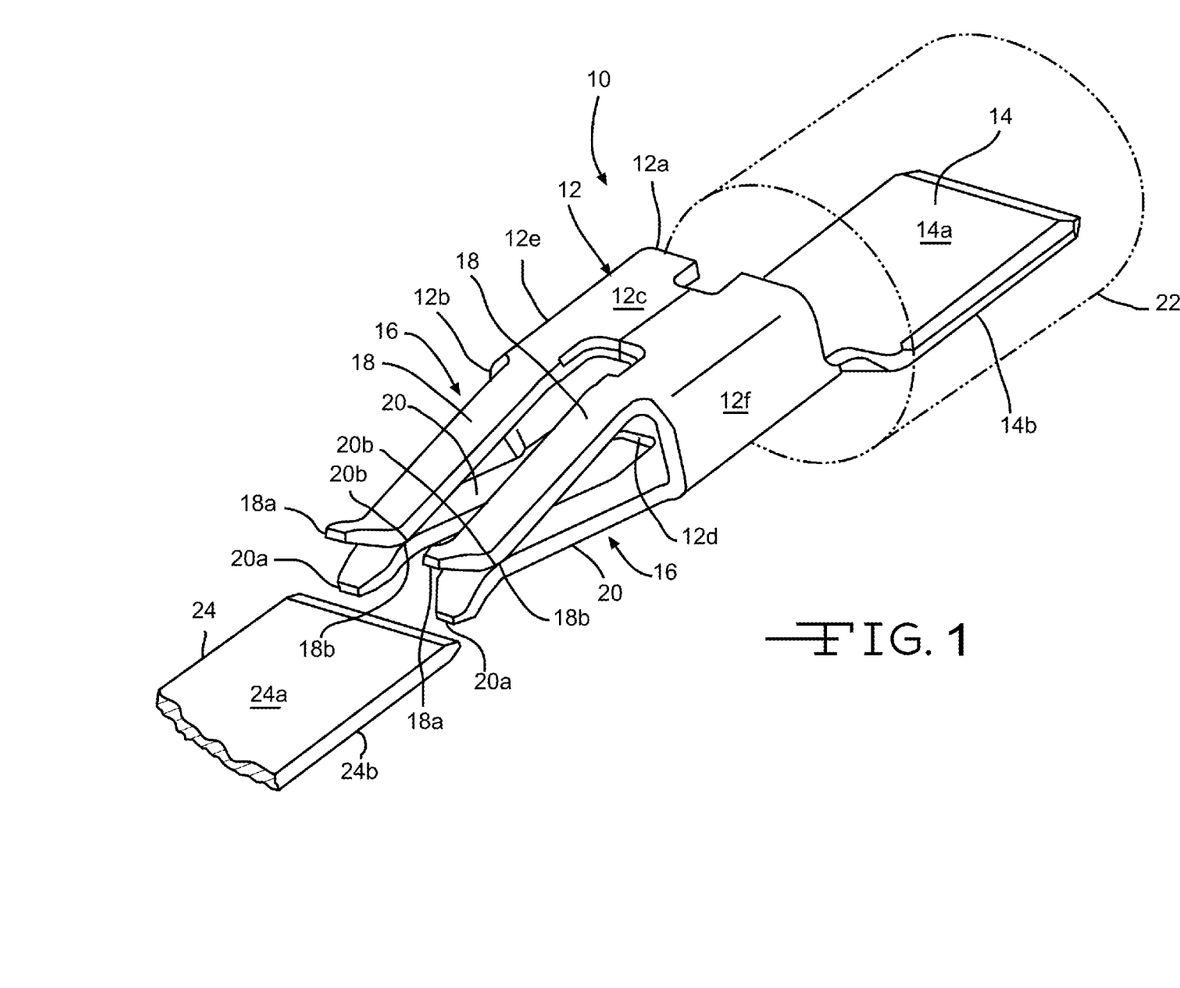
FIG. 1 is a perspective view of an improved electrical terminal formed in accordance with the improved method of forming an electrical terminal of this invention.
Figure 2:
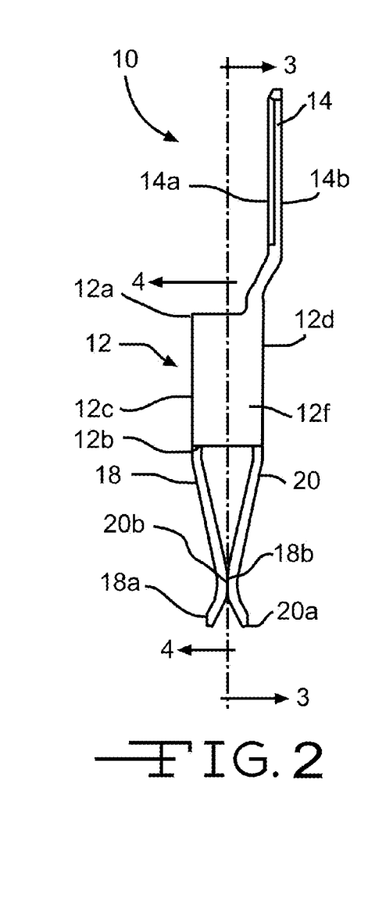
FIG. 2 is a side elevational view of the electrical terminal illustrated in FIG. 1.

A connector portion 14 extends outwardly from the second side wall 12d at the first end 12a of the body 12. In the illustrated embodiment, the connector portion 14 is substantially flat having opposing major faces 14a and 14b. The connector portion 14 is configured to be electrically connected to electrical wiring, a busbar, or any other suitable electrically conductive member or device (not shown). The connector portion 14 of the electrical terminal 10 may be attached in a conventional manner to a connector body 22, such as of a wire harness (not shown). Such a connector body 22 may be made of a non-electrically conductive material, such as plastic. The electrical terminal 10 may be integrally molded into the connector body 22 or attached thereto by any desired means. Although illustrated as substantially flat, the connector portion 14 may be formed having any suitable shape that promotes an electrical and/or mechanical connection with the attached electrical wiring, busbar, conductive member, or device.

Two pairs of contact arms 16 extend outwardly from the second end of the body 12. Each pair of contact arms 16 is substantially identical and includes a first contact arm 18 (upper arm when viewing FIG. 1) extending outwardly from the first side wall 12c at the second end 12b of the body 12, and a second contact arm 20 (lower arm when viewing FIG. 1) extending outwardly from the second side wall 12d at the second end 12b of the body 12. Each first contact arm 18 is elongated and substantially flat and includes a distal end 18a that is outwardly bent or curved and defines a contact surface 18b, best shown in FIG. 4, on an inwardly facing surface of the first contact arm 18. Similarly, each second contact arm 20 is elongated and substantially flat and includes a distal end 20a that is outwardly bent or curved and defines a contact surface 20b, best shown in FIG. 3, on an inwardly facing surface of the second contact arm 20. When assembled as shown in FIG. 1, the first and second contact arms 18 and 20 are bent slightly inwardly, i.e., toward each other, such that the contact surfaces 18b and the contact surfaces 20b are urged toward each other and into contact, or near contact, with one another.

In the illustrated embodiment, two pairs of contact arms 16 are shown. Alternatively, the electrical terminal 10 may be formed with one pair of contact arms 16, more than two pairs of contact arms 16, or a single contact arm 18 or 20. Also, although the contact arms 18 and 20 are illustrated as being elongated and substantially flat with outwardly bent or curved distal ends, it will be understood that the contact arms 18 and 20 may have any other desired shape configured to electrically connect each contact arm 18 and 20 with a mating male terminal 24, described below.

The illustrated electrical terminal 10 is formed from aluminum by a method described below. Alternatively, the electrical terminal 10 may be formed from any suitable electrically conductive material, such as copper and other conductive metals, and conductive polymers, such as a carbon fiber polymer matrix and other conductive polymers, capable of being subsequently formed in any of the methods described below. Additionally, the electrical terminal 10 may be formed from a laminate of a conductive metal and a non-conductive material, such as copper and polyester.

The illustrated electrical terminal 10 is configured to mate with an electrically conductive member or male terminal 24, shown in FIG. 1 as a substantially flat member having first and second major surfaces 24a and 24b. In use, the male terminal 24 is inserted between the first and second contact arms 18 and 20 such that the first major surface 24a of the male terminal 24 contacts the contact surfaces 18b of the first contact arms 18, and the second major surface 24b of the male terminal 24 contacts the contact surfaces 20b of the second contact arms 20.

Figure 3:
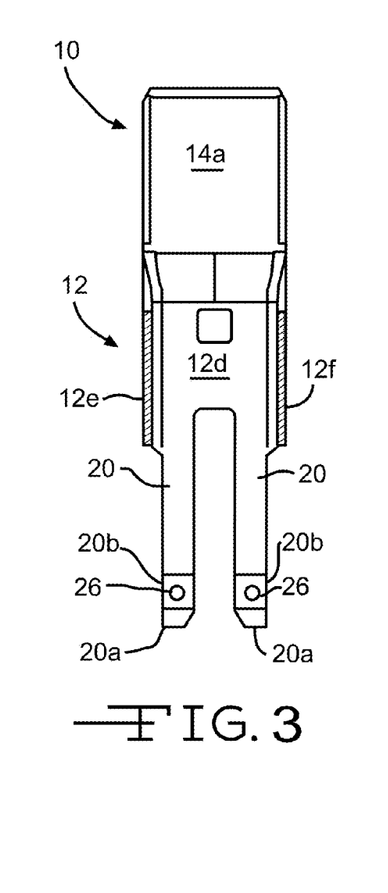
FIG. 3 is a cross sectional view taken along the line 3-3 of FIG. 2.
Figure 4:
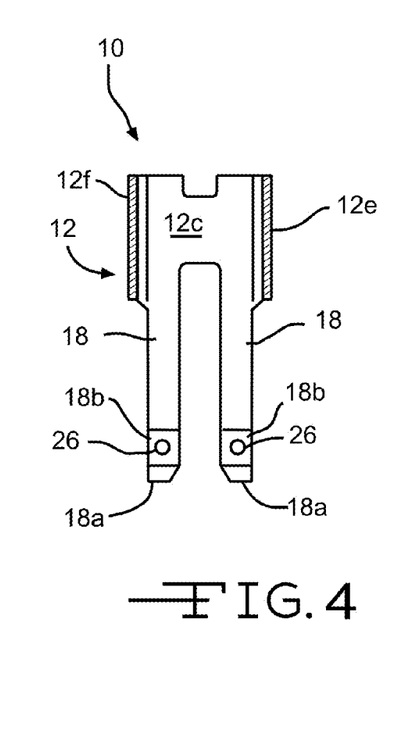
FIG. 4 is a cross sectional view taken along the line 4-4 of FIG. 2.

FIGS. 3 and 4 illustrate the improved contact surface 18b of the first contact arm 18 and the improved contact surface 20b of the second contact arm 20, in accordance with this invention. The improved contact surfaces 18b and 20b include conductive interfaces 26, described in detail below.

Figure 5:
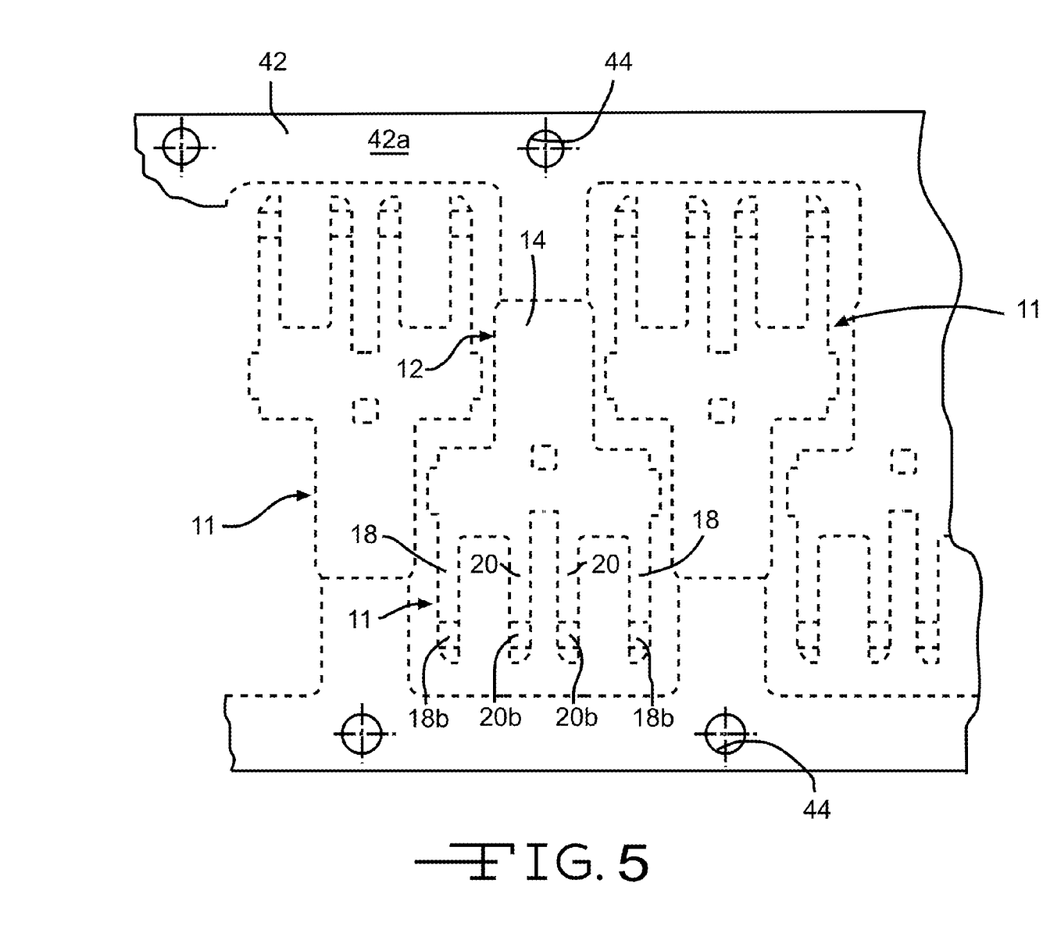
FIG. 5 is a top plan view of a portion of electrically conductive material stock showing the outline of the improved electrical terminal illustrated in FIG. 1 to be formed in accordance with a first embodiment of the improved method of forming electrical terminal.
Figure 6:
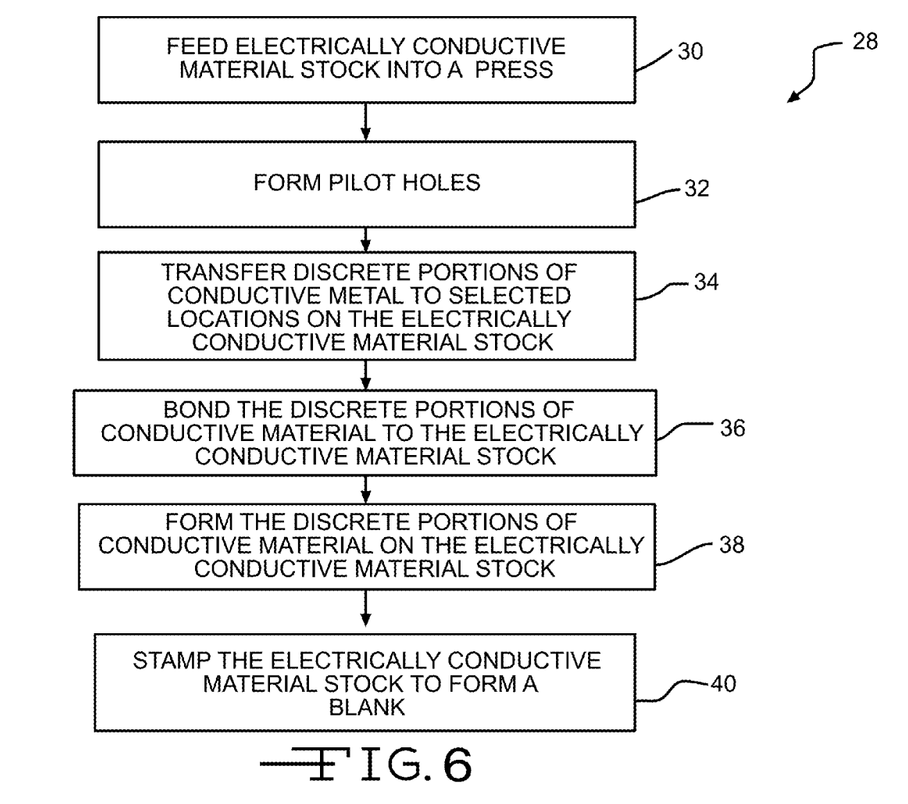
FIG. 6 is a flow chart showing the first embodiment of a method of forming the improved electrical terminal illustrated in FIG. 1.

Referring now to FIG. 6, a first embodiment of a method of forming the improved electrical terminal 10 in accordance with this invention is shown at 28. In a first step 30 of the first embodiment of the method 28 of forming the improved electrical terminal 10, electrically conductive material 42, shown in FIG. 5, is fed into a press (not shown). In one embodiment, the electrically conductive material 42 is metal stock that is configured as a coil of sheet aluminum having a first or upper surface 42a (the visible surface when viewing FIG. 5) and a second or lower surface 42b (see FIG. 7C). Alternatively, the electrically conductive material 42 may be any electrically conductive material, including an electrically conductive polymer as described above. Although it is preferable to use coiled sheet aluminum as the metal stock 42, the illustrated method may also be successfully practiced with substantially flat sheets of aluminum or flat sheets of any other desired electrically conductive material.

In a second step 32 of the first embodiment of the method 28, pilot holes 44 are formed in the metal stock 42. In the illustrated embodiment, the pilot holes 44 are circular and formed along the edges of the metal stock 42. Alternatively, the pilot holes 44 may have any desired shape and may be formed at any desired location in the metal stock 42. Because of the multiple process steps that occur in the press, i.e., stamping and precisely locating conductive interfaces 26 as described below, it is important that the metal stock 42 be advanced through the press very precisely so that metal stock 42 aligns with the press within, for example, a few thousandths of an inch as the metal stock 42 moves from station to station in the press. Typically, bullet-shaped or conical pilot members may be inserted into the pilot holes 44 to ensure the metal stock 42 remainsproperly aligned with the press. Although the metal stock 42 has not yet been pressed as shown in FIG. 5, the shape of the electrical terminal 10 to be formed is shown by dashed line for clarity.

In a third step 34 of the first embodiment of the method 28, discrete portions of electrically conductive material, such as the discrete portions of electrically conductive material 26a described below, are transferred to selected locations, i.e., the contact surfaces 18b and 20b on the upper surface 42a of the metal stock 42. In a fourth step 36 of the first embodiment of the method 28, the discrete portions of the electrically conductive material 26a are bonded to the surface of the metal stock 42. In a fifth step 38 of the first embodiment of the method 28, the discrete portions of electrically conductive material 26a are formed to the surface of the metal stock 42. In a sixth step 40 of the first embodiment of the method 28, the metal stock 42 is stamped to form a blank 11 in the shape of the improved electrical terminal 10. The improved electrical terminal 10, as shown in FIG. 1, may then be formed in a subsequent stamping operation, which may be part of a secondary manufacturing operation.

If desired, the upper surface 42a of the metal stock 42 may be pre-conditioned at locations that will become the contact surfaces 18b and 20b, such as by the localized application of heat. The upper surface 42a may be heated to a temperature within the range of from about 130 degrees C. to about 180 degrees C. by point radiant heating, with a laser heat source, via conduction, and other methods of applying localized heat. This heating step may occur at any time prior to the third step 34, when discrete portions of electrically conductive metal 26a are transferred to selected locations on the upper surface 42a of the metal stock 42.

Also if desired, the upper surface 42a may be cleaned prior to the third step 34. Any desired cleaning method may be used, including plasma cleaning, which will increase the temperature of the upper surface 42a, vaporize contaminants, and may advantageously etch the upper surface 42a to facilitate bonding. Additionally, the upper surface 42a may be chemically cleaned or mechanically cleaned. In addition to being cleaned in the first or second steps 30 and 32, the upper surface 42a of the metal stock 42 may be cleaned at any time and any location prior to the first step 30 when the metal stock 42 is fed into a press. For example, the upper surface 42a of the metal stock 42 may be cleaned in a stand-alone cleaning operation, or by the metal stock 42 supplier.

If desired, a layer of tin may be bonded to the contact surfaces 18b and 20b prior to the transfer of the discrete portions of electrically conductive material 26a thereto, to enhance the strength of the bond of the discrete portions of electrically conductive material 26a.

Figures 7A, 7B, 7C:
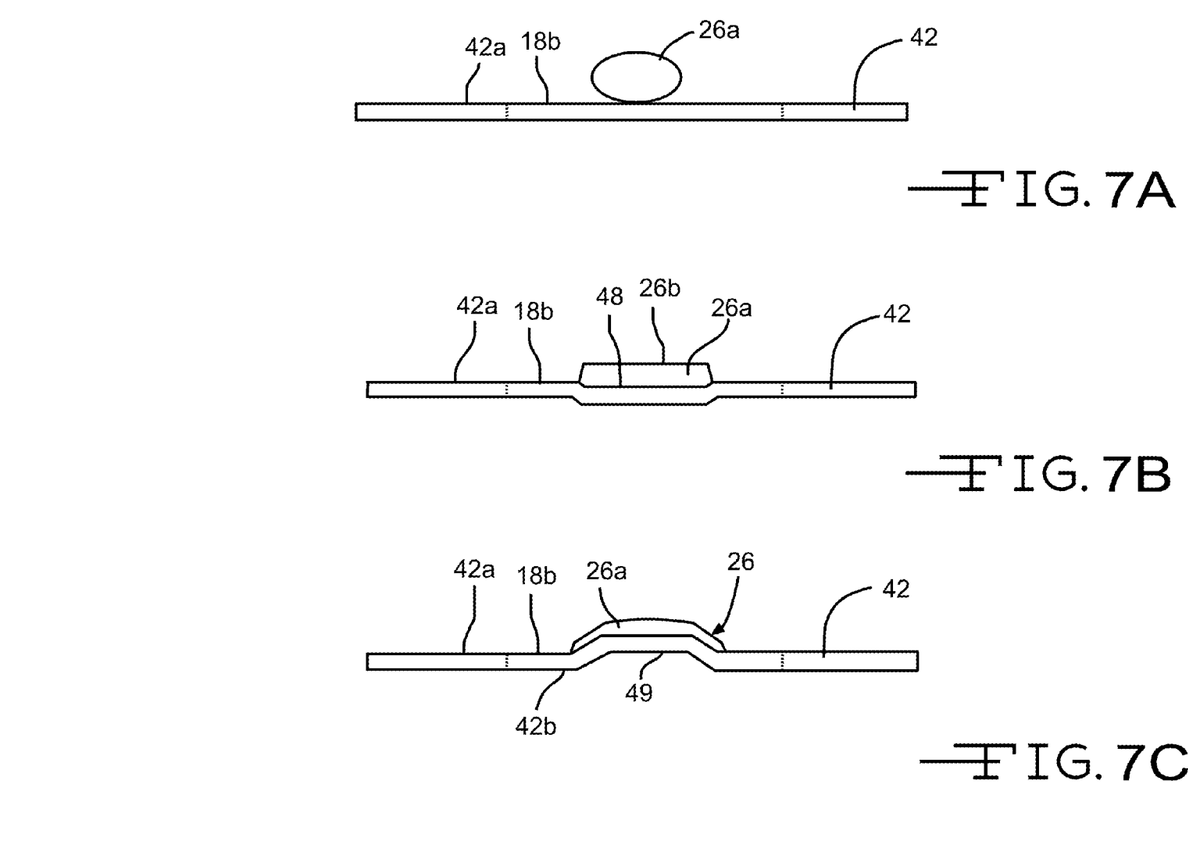
FIG. 7A is a schematic elevational view of a first step in a first embodiment of a method of transferring, bonding, and forming discrete portions of electrically conductive material to a surface of electrically conductive material stock.
FIG. 7B is a schematic elevational view of a second step of the first embodiment of the method of transferring, bonding, and forming discrete portions of electrically conductive material to a surface of electrically conductive material stock shown in FIG. 7A.
FIG. 7C is a schematic elevational view of a third step of the first embodiment of the method of transferring, bonding, and forming discrete portions of electrically conductive material to a surface of electrically conductive material stock shown in FIGS. 7A and 7B.

A first embodiment of a method of transferring, bonding, and forming discrete portions of electrically conductive material 26a to selected locations on the upper surface 42a of the metal stock 42 is shown schematically in FIGS. 7A-7C. As shown in FIG. 7A, portions of electrically conductive material 26a that will form the conductive interfaces 26 are applied to the metal stock 42 at locations that will become the contact surfaces 18b and 20b. In FIGS. 7A-7C for example, the contact surface 18b is shown. The portion of electrically conductive material 26a may be temporarily or permanently bonded to the upper surface 42a of the metal stock 42. For example, the portion of electrically conductive material 26a may be bonded to the upper surface 42a by liquid surface tension, metallic bonding, or chemical bonding, such as with adhesive (not shown).

Any desired adhesive may be used, such as adhesives in the cyanoacrylate family of strong fast-acting adhesives. Such adhesive may be placed between the portion of electrically conductive material 26a and the upper surface 42a, or at a perimeter of the portion of electrically conductive material 26a. If desired, the adhesive may include a rubber compound with a wetting agent to facilitate sealing of the exposed edges of the conductive interface 26.

In the illustrated embodiment, the portion of electrically conductive material 26a is substantially ovoid in shape. Alternately, the portion of electrically conductive material 26a may have any desired shape, such as spherical or irregularly shaped. The portion of electrically conductive material 26a may be formed from any desired electrically conductive material, including copper and precious metal such as silver, gold, and platinum.

Once applied to the upper surface 42a, the portion of electrically conductive material 26a may then be struck and shaped, such as in a stamping operation. This stamping operation may alter the shape of the electrically conductive material 26a, and may also form a first depression 48 in the upper surface 42a of the metal stock 42 at the contact area between the electrically conductive material 26a and the upper surface 42a, as shown in FIG. 7B. A die, a press, or other suitable tool or tools (not shown) may be used to perform the stamping. In the embodiment illustrated, the stamping operation results in a substantially flat surface 26b on the electrically conductive material 26a.

The stamping operation may also facilitate solid phase bonding between the electrically conductive material 26a and the upper surface 42a of the metal stock 42. Solid phase bonding generally bonds two materials together without the formation of any liquid phase interfacial material, as the solid phase bonding temperature is typically lower than the melting point of the joined metals. If desired, the stamping process may also include a post forming heat treatment to improve the bond quality. Such post forming heat treatment may be achieved for example, by passing an electric current through the metal of the electrically conductive material 26a and the metal stock 42 at their interface. Additionally, stamping tools (not shown) may also be preheated to provide an elevated temperature to the metals.

A secondary stamping operation may be performed to provide a finished shape for the conductive interface 26, as shown in FIG. 7C. In the illustrated embodiment, the underside 42b of the metal stock 42 is stamped to define a second depression 49 and to urge the electrically conductive material 26a outwardly (upwardly when viewing FIG. 7C). The upper surface 42a may also be stamped to define a desired shape. As shown, the conductive interface 26 has a substantially domed shape that extends outwardly from the upper surface 42a of the metal stock 42. Alternatively, the conductive interface 26 may have other shapes, such as rod-shaped, disc-shaped, cone-shaped, frustoconical-shaped, and wedge-shaped. Additionally, the upper surface 42a may also be stamped such that the electrically conductive material 26a is co-planar or substantially co-planar with the upper surface 42a. The outer surfaces, i.e., the surfaces that will engage the mating male terminal 24, of any of the conductive interfaces 26 described herein, may be knurled.

Advantageously, the stamping operation will strengthen the solid phase bond between the conductive interface 26 and the metal stock 42.

Figure 8A:
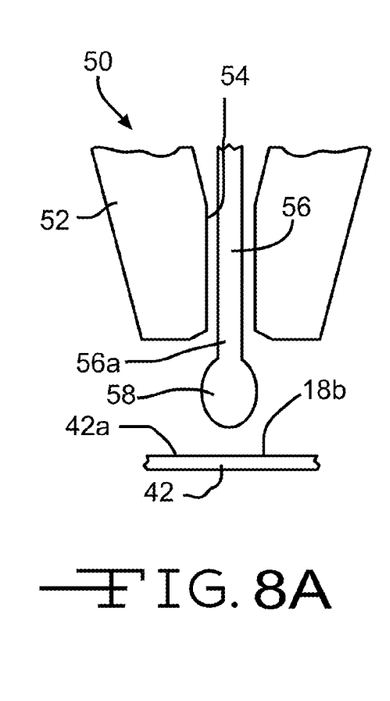
FIG. 8A is a schematic elevational view of a first step in a second embodiment of a method of transferring, bonding, and forming discrete portions of electrically conductive material to a surface of electrically conductive material stock.
Figure 8B:
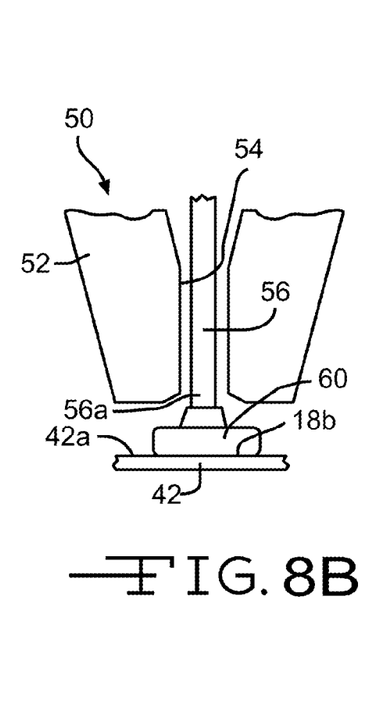
FIG. 8B is a schematic elevational view of a second step of the second embodiment of the method of transferring, bonding, and forming discrete portions of electrically conductive material to a surface of electrically conductive material stock shown in FIG. 8A.
Figure 8C:
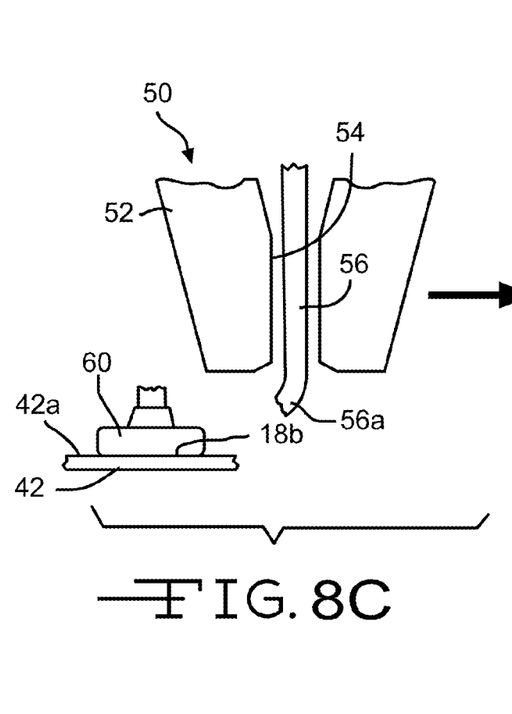
FIG. 8C is a schematic elevational view of a third step of the second embodiment of the method of transferring, bonding, and forming discrete portions of electrically conductive material to a surface of electrically conductive material stock shown in FIGS. 8A and 8B.

A second embodiment of a method of transferring, bonding, and forming discrete portions of electrically conductive material to selected locations on the upper surface 42a of the metal stock 42 is a ball forming and bonding process shown schematically in FIGS. 8A-C. As shown in FIGS. 8A-8C, an apparatus 50 is provided that includes a capillary 52 that is positioned above the upper surface 42a of the metal stock 42. The capillary 52 includes a passageway 54 through which a wire 56 extends toward the upper surface 42a. Like the portion of electrically conductive material 26a described above, the wire 56 may be formed from any desired electrically conductive material, including precious metal such as copper, silver, gold, and platinum.

In a first step, as shown in FIG. 8A, a high-voltage electric charge is applied to an end 56a of the wire 56 that extends outwardly from the passageway 54. The application of the electrical charge melts the end of the wire 56. The melted wire 56 forms into a portion or ball 58 due to the surface tension of the molten material of the wire 56, and quickly begins to solidify.

As shown in FIG. 8B, the capillary 52 is lowered, or moved toward the metal stock 42, such that the ball 58 is urged into contact with the upper surface 42a of the metal stock 42 at locations that will become the contact surfaces 18b and 20b. In FIGS. 8A-8C for example, the contact surface 18b is shown.

If desired, the upper surface 42a of the metal stock 42 may be preheated, by any of the methods described above, to a desired temperature, such as a temperature within the range of from about 130 degrees C. to about 180 degrees C. to facilitate attachment of the ball 58 to the contact surface 18b or the contact surface 20b. When the capillary 52 urges the ball 58 into contact with the upper surface 42a, ultrasonic energy may be applied, such as with a transducer (not shown) to further facilitate attachment of the ball 58 to the contact surface 18b. The combination of heat, pressure, and ultrasonic energy create a stud bump 60 which is bonded to the upper surface 42a of the metal stock 42.

Figure 9:
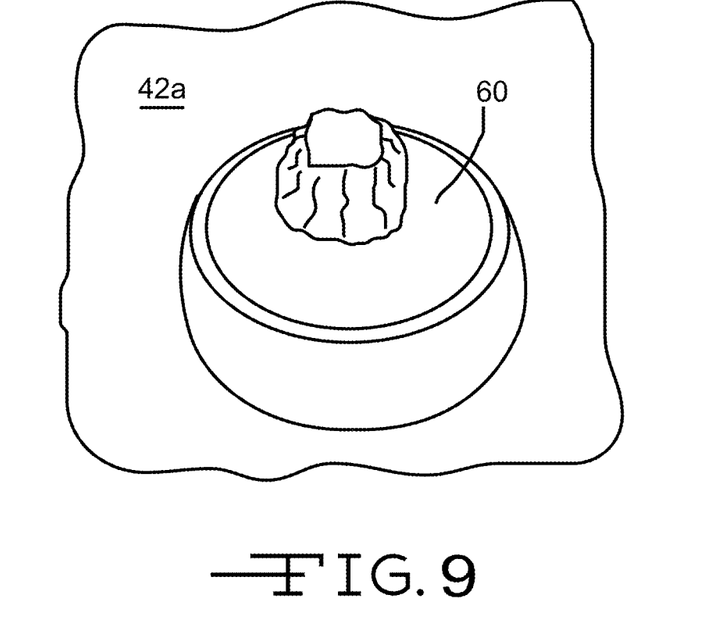
FIG. 9 is a perspective view of a first embodiment of the stud bump formed in the second embodiment of the method illustrated in FIGS. 8A-8C.

Referring to FIG. 8C, a small length of wire 56 is fed downwardly through the passageway 54 of the capillary 52, and the capillary 52 is moved laterally, in the direction of the arrow A, thus tearing the wire 56 immediately above the stud bump 60, also shown in FIG. 9. The stud bump 60 will be further formed in a subsequent forming operation to define the conductive interface 26, e.g., pressed to flatten the stud bump 60 and bond it to the upper surface 42a of the metal stock 42, such as described above and shown in FIGS. 7B and 7C. Alternatively, a set of clamps (not shown) may be used to tear or clip the wire 56.

Figure 10:
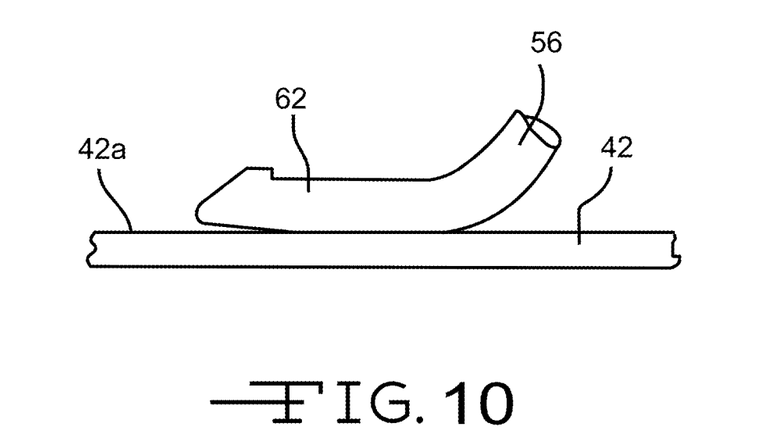
FIG. 10 is a side elevational view of a second embodiment of a stud bump formed in a third embodiment of a method of transferring, bonding, and forming discrete portions of electrically conductive material to a surface of electrically conductive material stock.

In a third embodiment of a method of transferring, bonding, and forming discrete portions of electrically conductive material to selected locations on the upper surface 42a of the metal stock 42, the method described above and shown in FIGS. 8A-8C, may be modified. For example, the capillary 52 may instead be moved toward the upper surface 42a such that the wire 56 is crushed between the tip of the capillary 52 and the upper surface 42a. This alternative method results in a stud bump 62 having a shape as shown in FIG. 10. Like the stud bump 60, the stud bump 62 will be further formed in a subsequent forming operation to define the conductive interface 26, e.g., pressed to further flatten the stud bump 62 and bond it to the upper surface 42a of the metal stock 42, for example as described above and shown in FIGS. 7B and 7C.

If desired, a depression such as the first depression 48 shown in FIG. 7B may be formed in the upper surface 42a of the metal stock 42 at any location where the discrete portions of electrically conductive material, including the portion 26a, the ball 58, the stud bumps 60 and 62, and an insert 72 (described in detail below) will be bonded.

Figure 11A:
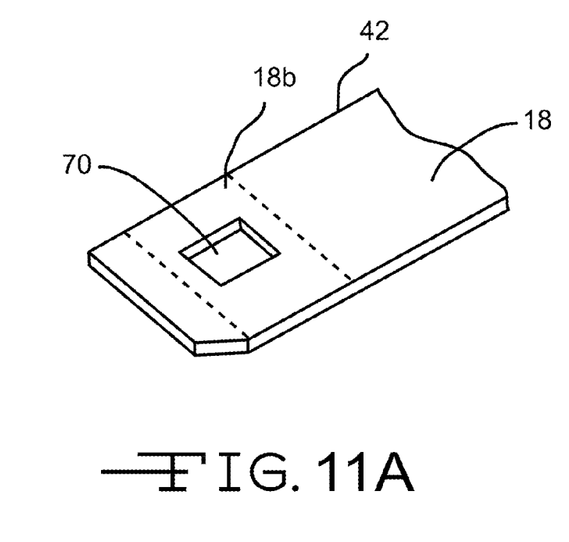
FIG. 11A is a perspective view of a first step in a fourth embodiment of a method of transferring, bonding, and forming discrete portions of electrically conductive material to a surface of electrically conductive material stock.
Figure 11B:
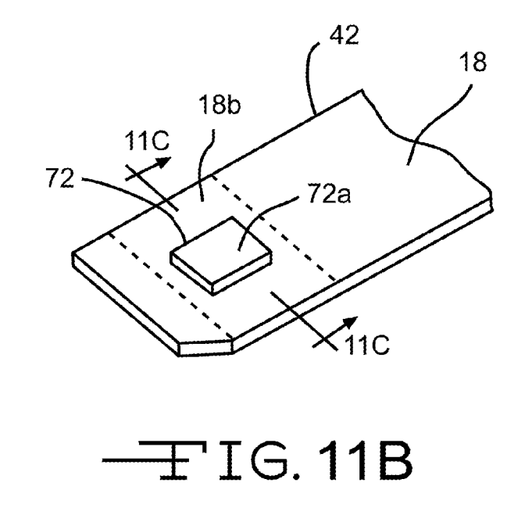
FIG. 11B is a perspective view of a second step of the fourth embodiment of the method of transferring, bonding, and forming discrete portions of electrically conductive material to a surface of electrically conductive material stock shown in FIG. 11A.
Figure 11C:
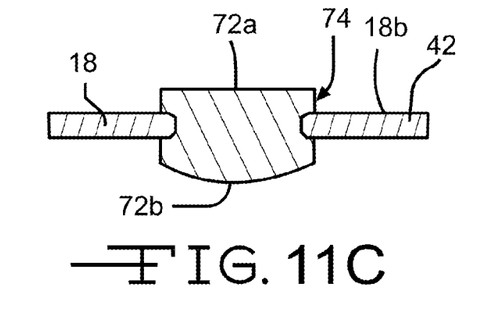
FIG. 11C is a cross sectional view taken along the line 11C-11C of FIG. 11B.

A fourth embodiment of a method of transferring, bonding, and forming discrete portions of electrically conductive material to selected locations on the upper surface 42a of the metal stock 42 is the forming and bonding process shown schematically at 68 in FIGS. 11A-11C, which creates a dual sided interface 74. Such a dual sided interface 74 may be used in electrical terminals where it is desirable to have an electrically conductive interface on both sides of a contact member, such as the contact arm 18.

As shown in FIG. 11A, apertures 70 are formed in the metal stock 42 at locations that will become the contact surfaces 18b and 20b. In FIGS. 11A-11C for example, the contact surface 18b of the first contact arm 18 is shown. The illustrated aperture 70 is rectangular in shape, however the aperture 70 may have any desired shape and size.

Referring to FIG. 11B, the portion of electrically conductive material that will form the conductive, dual sided interface 74 is embodied as a discrete member or insert 72 having a first side 72a (upwardly facing side when viewing FIGS. 11B and 11C) and a second side 72b (downwardly facing side when viewing FIGS. 11B and 11C). The illustrated insert 72 is substantially the same size and shape as the aperture 70, but is thicker than a thickness of the first contact arm 18. The insert 72 may be formed from any desired electrically conductive material, including precious metal such as copper, silver, gold, and platinum.

The aperture 70 may be formed at any desired time during the method of forming the improved electrical terminal 10, such as during the second or third steps 32 and 34, respectively.

As shown in FIG. 11B, the insert 72 is positioned in the aperture 70. The insert 72 may be positioned in the aperture 70 at any desired time during the method of forming the improved electrical terminal 10, such as after the formation of the aperture 70 during the second or third steps 32 and 34, respectively.

A compressive force is then applied to both the first and second sides 72a and 72b, respectively, to form the interface 74 shown in FIG. 11C. As shown, the applied compressive force deforms the insert 72 like a rivet wherein the material of the first and second sides 72a and 72b becomes enlarged and captures the first contact arm 18 therebetween. In the embodiment illustrated however, the compressive force applied to the insert 72 does not need to be high enough to create a compressive clamping force between the first and second sides 72a and 72b of the insert 72 and the first contact arm 18, but only sufficiently high enough to create a solid phase bond between the insert 72 and the first contact arm 18.

In the illustrated embodiments, the discrete portions of electrically conductive material, such as the discrete portions of electrically conductive material 26a, are transferred, bonded, and formed to selected locations on the upper surface 42a of the metal stock 42 before the metal stock 42 is stamped to form a blank 11 in the shape of the improved electrical terminal 10, and subsequently stamped to form the finished electrical terminal 10, as shown in FIG. 1. Alternatively, the transferring, bonding, and forming steps described herein may be performed on the stamped blanks having the shape of the improved electrical terminal 10 in a subsequent manufacturing step, which may be part of a secondary manufacturing operation.

Figure 12:
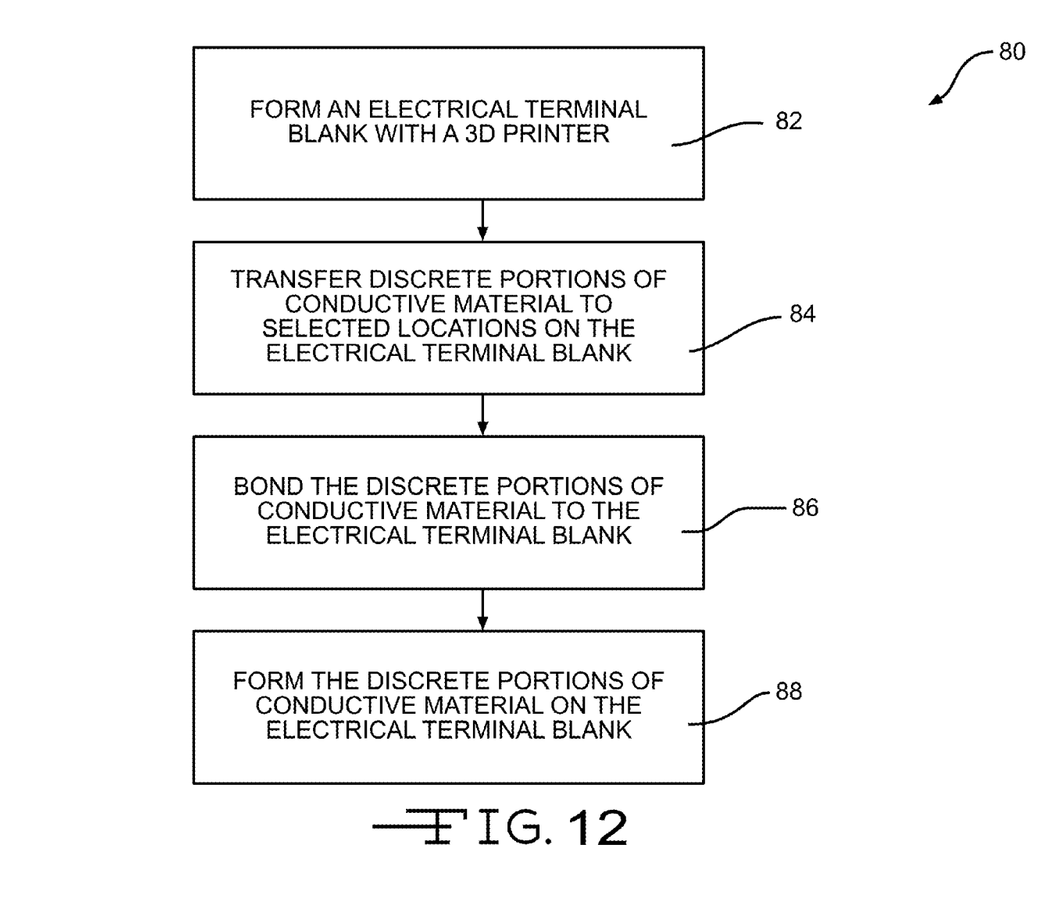
FIG. 12 is a flow chart showing a second embodiment of a method of forming the improved electrical terminal illustrated in FIG. 1.

Referring now to FIG. 12, a second embodiment of a method of forming the improved electrical terminal 10 in accordance with this invention is shown at 80. In a first step 82 of the second embodiment 80 of the method of forming the improved electrical terminal 10, a dielectric blank, such as a blank having the shape of the blank 11 described above, is formed using a 3D printer (not shown). In a first embodiment, the blank is formed from a first, non-conductive layer and a second layer of conductive material, such as conductive polymer, or any conductive material suitable for use in a 3D printer.

In a second step 84, one or more portions of electrically conductive material, such as the discrete portions of electrically conductive material 26a described above, are transferred to selected locations that will become the contact surfaces 18b and 20b, as described above and will define interfaces, such as the interfaces 26. In a third step 86, the discrete portions of electrically conductive material 26a are bonded to the surface of the blank. In a fourth step 88, the discrete portions of electrically conductive material 26a are formed to the surface of the blank. The portions of electrically conductive material 26a may be transferred, bonded, and formed to the blank by any desired method, for example by force, heat distortion, or by any of the methods of transferring, bonding, and forming described above.

The improved electrical terminal 10, as shown in FIG. 1, may then be formed from the blank in a subsequent forming operation, which may be part of a secondary manufacturing operation.

Alternatively, in a second embodiment of the first step 82, the blank is formed from a conductive material, such as conductive polymer, or any conductive material suitable for use in a 3D printer. In this embodiment, the discrete portions of electrically conductive material 26a may be transferred directly to a surface of the blank.

Additionally, in a third embodiment of the first step 82, the blank formed in the 3D printing process may have the final three dimensional shape of the electrical terminal 10. The transferring, bonding, and forming steps for the discrete portions of electrically conductive material 26a described above may then be applied to selected locations of the three dimensional blank.

The principle and mode of operation of the invention have been described in its preferred embodiments. However, it should be noted that the invention described herein may be practiced otherwise than as specifically illustrated and described without departing from its scope.

What is claimed is:

1. A method of forming an electrical terminal comprising the steps of:
    (a) transferring a portion of an electrically conductive material to a selected location on a surface of an electrically conductive material stock;
    (b) forming a depression at the selected location on the surface of the electrically conductive material stock;
    (c) bonding the portion of the electrically conductive material to the selected location on the surface of the electrically conductive material stock;
    (d) forming the portion of the electrically conductive material to the surface of the electrically conductive material stock to define a conductive interface; and
    (e) forming an electrical terminal from the electrically conductive material stock.

2. The method according to claim 1, wherein the electrically conductive material stock is formed from one of an electrically conductive metal and an electrically conductive polymer.

3. The method according to claim 1, wherein the electrically conductive material is one of copper, silver, gold, and platinum.

4. The method according to claim 1, wherein step (a) is performed prior to step (b).

5. The method according to claim 1, wherein the selected location on the surface of the electrically conductive material stock is a location that will define a contact surface of the electrical terminal.

6. The method according to claim 1, further including forming the electrically conductive material stock to define a blank having the shape of the electrical terminal.

7. The method according to claim 1, wherein step (c) is performed by one of liquid surface tension, metallic bonding, and chemical bonding.

8. The method according to claim 1, wherein step (c) is performed by a ball forming and bonding process.

9. The method according to claim 1, wherein step (c) is performed by urging a portion of a conductive wire into the surface of the electrically conductive material stock such that a solid phase bond is formed between the portion of the conductive wire and the surface of the electrically conductive material stock.

10. A method of forming an electrical terminal comprising the steps of:
    (a) forming an aperture in an electrically conductive material stock;
    (b) positioning an insert formed from an electrically conductive material in the aperture in the electrically conductive material stock;
    (c) applying a compressive force to at least one side of the insert to bond the insert to the electrically conductive material stock;
    (d) forming the portion of the electrically conductive material to the surface of the electrically conductive material stock to define a conductive interface; and
    (e) forming an electrical terminal from the electrically conductive material stock.

* * * * *